United States Patent [19]

Bezard et al.

[11] Patent Number: 4,558,456
[45] Date of Patent: Dec. 10, 1985

[54] APPARATUS FOR MONITORING THE LEVEL OF LIQUID IN A TANK OR RESERVOIR

[75] Inventors: Jean-Jacques Bezard, La Garenne; Charles H. Jourdain, Frepillon; Bruno Lalanne, Courbevoie, all of France

[73] Assignee: JAEGER, France

[21] Appl. No.: 424,447

[22] Filed: Sep. 27, 1982

[30] Foreign Application Priority Data

Oct. 7, 1981 [FR] France ............................. 81 18852

[51] Int. Cl.⁴ .............................................. G01F 23/24
[52] U.S. Cl. ........................................ 377/25; 377/20; 377/39; 377/49; 73/295; 340/620
[58] Field of Search ..................... 340/620; 377/20, 25, 377/39, 49; 73/295

[56] References Cited

U.S. PATENT DOCUMENTS

| | | | |
|---|---|---|---|
| 3,601,586 | 8/1971 | Slavin | 377/25 |
| 3,617,713 | 11/1971 | Karlsson | 377/25 |
| 3,878,370 | 4/1974 | Santomango et al. | 377/39 |
| 4,164,648 | 8/1979 | Chu | 377/20 |
| 4,397,031 | 8/1983 | Weber | 377/20 |

FOREIGN PATENT DOCUMENTS 0008508 3/1980 European Pat. Off. .
0019540 11/1980 European Pat. Off. .
2367276 5/1978 France .

Primary Examiner—John S. Heyman
Attorney, Agent, or Firm—Schwartz, Jeffery, Schwaab, Mack, Blumenthal & Evans

[57] ABSTRACT

Apparatus for monitoring the level of liquid in a tank or reservoir comprises a probe formed by a resistive metal element having a high temperature coefficient, and a supply means for the probe. The apparatus further comprises a voltage-frequency converter which is connected in parallel with the probe, two counters which are connected in parallel to the output of the converter, and a subtracting means connected to the outputs of the counters. A time base controls operation of the supply means during a complete cycle to effect a counting operation of the first counter for a given period of time at the beginning of a cycle, a counting operation of the second counter for the same period of time but at the end of the cycle, and operation of the subtracting means at the end of the cycle.

5 Claims, 2 Drawing Figures

APPARATUS FOR MONITORING THE LEVEL OF LIQUID IN A TANK OR RESERVOIR

BACKGROUND OF THE INVENTION

The present invention concerns an apparatus for monitoring the level of liquid in a tank or reservoir and constitutes an improvement in the apparatus of U.S. Pat. No. 4,163,391 issued Aug. 7, 1979.

Apparatuses are already known, of the type comprising a probe formed by a resistive metal element having a high temperature coefficient, which is intended to be immersed in the liquid in a tank or reservoir, a means for supplying the probe with current, and means for comparing the initial voltage Uo at the terminals of the probe, to the voltage Ut at the terminals of the probe after a period of time t, at which the probe has attained a condition of thermal stability. The expression initial voltage Uo is used to denote the voltage at the terminals of the probe at the moment to at which the current supply means is set in operation. It is known in fact that a resistive metal element having a high temperature coefficient undergoes an increase in its own resistance in dependence on temperature, and consequently the current which passes therethrough, it being appreciated that those two parameters are linked. Thus, when such a resistive element is immersed in a liquid, its own resistance depends on the level of liquid in which it is immersed, since the part of the resistive element which is above the liquid and which is therefore exposed to the air is cooled to a much lesser degree than the immersed part.

When the level of liquid in which the resistive element is immersed rises, the mean temperature of the element falls, and therefore accordingly also its resistance.

It will be appreciated that the opposite phenomenon occurs when there is a fall in the level of liquid in which the resistive element is immersed.

The aforementioned U.S. Pat. No. 4,163,391 thus describes various embodiments of apparatuses for monitoring the level of liquid in a tank or reservoir, making use of such a principle.

SUMMARY OF THE INVENTION

The aforementioned U.S. Pat. No. 4,163,391 is quoted herein by way of reference, and that patent may be consulted for full comprehension of the present description.

The present invention now proposes a novel apparatus for monitoring the level of liquid in a tank or reservoir, which is found to be particularly simple in design, while providing a high degree of reliability and a high level of measuring accuracy.

In accordance with the present invention, the means for comparing the voltage Uo and the voltage Ut comprise a voltage-frequency converter having an input connected to the terminals of the probe, two counters which are connected in parallel to the output of the voltage-frequency converter, a time base capable of controlling on the one hand the counting operation of a first counter for a given period of time, from the moment to at which the supply means is set in operation, the content of the first counter at the end of the first counting operation thus representing the voltage Uo measured at the terminals of the probe at the moment to at which the supply means is set in operation, and on the other hand, the counting operation of the second counter for the same given period of time, at the end of a time t at the end of which the probe has reached its condition of thermal stability, the content of the second counter at the end of the counting period thus representing the voltage Ut measured at the terminals of the said probe at the moment t, and finally, a subtracting means which is connected to the outputs of the two counters and which is controlled by the time base for producing an output signal proportional to the difference between the contents of the two counters.

It will be appreciated that, at the end of each cycle, there is available data relating to the initial voltage Uo, the voltage Ut and the voltage variation (Ut-Uo). This arrangement is therefore found to be particularly advantageous since it possibly permits corrections to be made, in dependence on the initial value of the voltage Uo.

BRIEF DESCRIPTION OF THE DRAWINGS

Other features and advantages of the present invention will be apparent from the following detailed description, and with reference to the accompanying drawing which is given by way of non-limiting example and in which.

DETAILED DESCRIPTION OF THE PREFERRED EMBODIMENT

Figure 1:
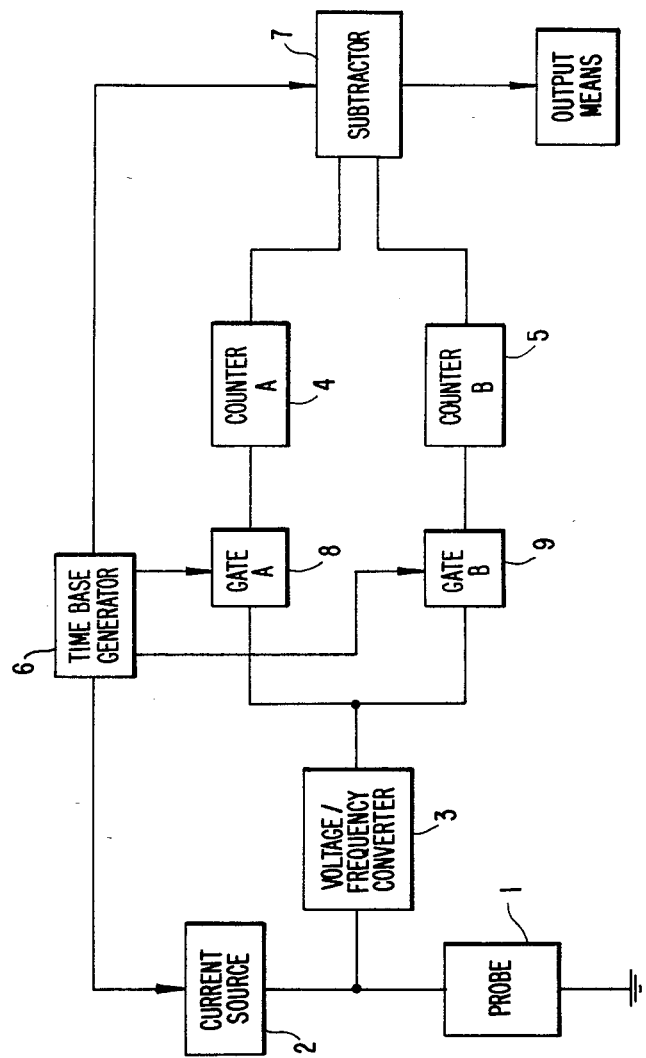
FIG. 1 shows the basic diagram of a liquid level monitoring apparatus according to the present invention.

As shown in the drawing, the apparatus for monitoring the level of liquid in a tank or reservoir comprises a probe 1 which is formed by a resistive metal element having a high temperature coefficient, the probe 1 being intended to dip into the liquid in the tank or reservoir. The probe 1 is connected between earth and the output of a current supply means 2. It will be appreciated that the current supply means 2 may comprise either a current generator or a voltage generator supplying the probe 1 by way of a resistor.

A voltage-frequency converter 3 is connected to the terminals of the probe 1. The converter 3 produces at its output a signal whose frequency is proportional to the voltage U at the terminals of the probe 1. The output of the voltage-frequency converter 3 is respectively applied to two counters A and B as indicated at 4 and 5 in FIG. 1, by way of two gates A and B (indicated at 8 and 9). Counting operation of the counters A and B (4, 5) is controlled by a time base 6 which controls the gates A and B, as will be described in greater detail hereinafter. Finally, a subtracting means 7 is connected to the outputs of the two counters A and B. The time base 6 also controls on the one hand actuation of the current supply means 2 and on the other hand operation of the subtracting means 7.

The mode of operation of the apparatus shown in FIG. 1 will now be described in greater detail.

Figure 2A:
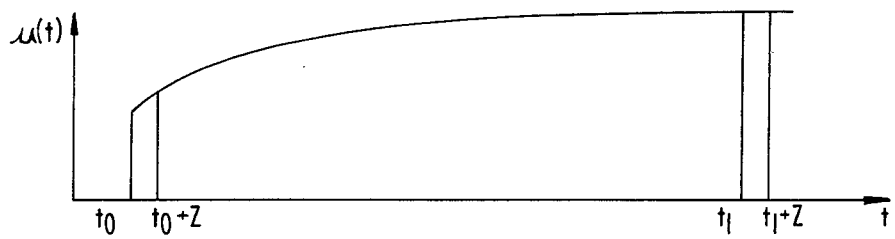
FIGS. 2a-2g show timing diagrams for illustrating the operation of the apparatus of the present invention.

As described in the aforementioned U.S. Pat. No. 4,163,399, when a resistant wire having a high temperature coefficient is supplied with current, the wire has a voltage of initial value Uo at its terminals, at the moment to at which the current supply means is set in operation. The initial voltage value Uo depends on ambient temperature and the resistance of the conductors which are connected in parallel with the wire, for measuring voltage. After a period of time t at the end of which the probe has attained its thermally stable condition, the voltage Ut which is then present at the terminals of the probe is always higher than the initial voltage Uo. The voltage at the terminals of the probe is shown in FIG. 2(a). It has been found that the increase in voltage was substantially exponential. On the other hand, the higher the level of liquid in which the element 1 is immersed, the lower falls the mean temperature of the element 1, because the portion of the element which is thus exposed to the air decreases in dependence on the rise in the level of liquid and the increasing cooling effect applied to the element 1.

Thus, as shown in FIG. 1 of U.S. Pat. No. 4,163,391, the initial voltage Uo at the terminals of the probe 1 when the current supply means 2 is set in operation is the same for two probes 1 which are strictly identical in characteristics, being respectively immersed in a liquid and in air. On the other hand, after a period of time t corresponding to the time after which the probe 1 has reached a condition of thermal stability, the voltage at the terminals of a probe 1 which is immersed in a liquid will be lower, for an equal current, than the voltage at the terminals of the probe 1 which is in the air. It will be appreciated that such a voltage difference is due to the mean temperature difference of the resistive element 1, as described hereinbefore.

Figure 2B:
Figure 2C:
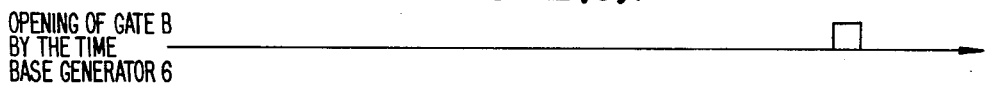

At the initial time to at the beginning of the cycle, the time base 6 causes the supply means 2 to be set in operation. At the same time, the time base 6 causes the gate A to be opened for a given period, as shown in FIG. 2(b). Consequently, the initial voltage Uo which is at the terminals of the probe 1 and which, due to the flow through the resistive element 1 of the current supplied by the supply means 2, is also applied to the input of the voltage-frequency converter 3, produces at the output of the converter 3 a frequency that is proportional to the initial voltage Uo at the terminals of the probe 1. With the gate A being in an open condition for a given period of time defined by the time base 6, it will be appreciated that the content of the counter A, at the end of the period for which the gate A is open, is proportional to the initial voltage Uo, as shown in FIG. 2(e). For that purpose, it will be appreciated that the given period of time for which the time base 6 causes the gate A to be open and therefore causes the counter A to be operative in a counting mode, must be very much shorter than the probe temperature rise time so that, at the end of the counting operation, the voltage at the terminals of the probe is still very close to the initial voltage Uo.

The time base 6 keeps the supply means 2 in operation, and it will be seen that the voltage at the terminals of the probe 1 rises until it reaches a condition of thermal stability. The rise in voltage at the terminals of the probe 1 is substantially inversely proportional to the level of liquid in the tank or reservoir. After a period of time t corresponding to the time after which the probe has substantially attained its condition of thermal stability, the time base 6 causes the gate B to open, as shown in FIG. 2(c) and causes the counter B (5) to count for a given period of time which is equal to the given period of time for which the gate A was open and the counter A counted, as described above. Thus, the content of the counter B (5) at the end of its counting operation is proportional to the frequency of the output signal of the voltage-frequency converter 3, which frequency is itself proportional to the voltage Ut at the terminals of the probe 1. The content of the counter 3 is therefore directly proportional to the voltage Ut, as shown in FIG. 2(f).

Figure 2D:
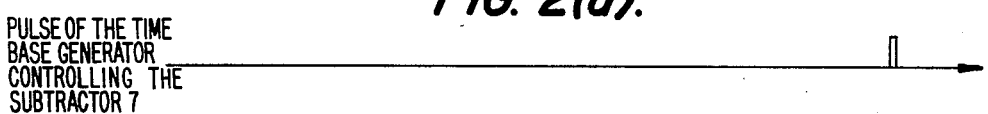
Figure 2E:
Figure 2F:
Figure 2G:

At the end of the time for which the gate B (9) is open, the time base 6 then causes operation of the subtracting means 7, as shown in FIG. 2(d) which is connected to the outputs of the two counters A and B. It will be appreciated in consequence that the subtracting means 7, which produces a signal proportional to the difference between the contents of the counters A and B, supplies information that is directly proportional to the value of the rise in voltage produced at the terminals of the probe 1 during the period of time t. Of course, such information can be easily used, for example by comparison with different predetermined levels, in order thereby to define the level of liquid in the tank or reservoir and consequently to actuate if necessary the appropriate warning device. When the above-indicated information is acquired, the cycle is concluded, and the time base 6 terminates actuation of the current supply means 2. It will be appreciated that the gates A and B (8, 9) may be omitted and the time base 6 may be directly connected to the counting enabling inputs of the counters A and B.

In accordance with the present invention, the applicants found that it was particularly advantageous for the voltage-frequency converter to be in the form of an oscillator of programmable unijunction transistor type. However, it will be appreciated that the voltage-frequency converter 3 may be of any suitable kinds. This also applies to the assembly of functional blocks shown in the accompanying drawing.

In particular, reference will be made to the description of the aforementioned U.S. Pat. No. 4,163,391 as regards the level indicating or warning circuits which are connected to the output of the subtracting means 7.

The present invention is applied in particular to measuring the level of liquid in vehicle tanks, and in particular measuring the level of oil or fuel.

It will be appreciated that the present invention is not limited to the embodiments described hereinbefore, on the basis of which other forms and embodiments may be envisaged, without thereby departing from the scope of the present invention. In particular, it is possible to provide a different output circuit for the subtracting means 7 to memorize the information available at the output thereof when the above-described cycle is repeated at regular intervals, such intervals being of sufficient length to permit the probe 1 to cool down before each fresh measuring operation, with the subtracting means 7 itself being rapidly reset to zero before each fresh input of information.

We claim:

1. An apparatus for monitoring the level of liquid in a tank or reservoir, of the type comprising a probe formed by a resistive metal element having a high temperature coefficient, a means for supplying current to the probe, and means for comparing the initial voltage Uo measured at the terminals of the probe at the time at which the current supply means is set in operation, to the voltage Ut measured at the terminals of the said probe at the time when there is a condition of thermal stability, characterised in that said comparison means comprise:

a voltage-frequency converter having its input connected to the terminals of the probe,
two counters connected in parallel to the output of the voltage-frequency converter, a time base controlling a first of said counters to count for a given period of time, from the moment at which the current supply means is set in operation, the content of the first counter at the end of the counting operation thus representing the voltage Uo, and controlling the second counter to count for the same given period of time when the probe has attained its condition of thermal stability, the content of the second counter at the end of the counting period thus representing the voltage Ut, and, a subtracting means which is connected to the output of the two counters and which is controlled by the time base for producing an output signal that is proportional to the difference between the contents of the two counters.

2. Apparatus according to claim 1 characterised in that a warning circuit is connected to the output of the subtracting means.

3. Apparatus according to claim 1 characterised in that a liquid level display circuit is connected to the output of the subtracting means.

4. Apparatus according to claim 1 characterised in that the subtracting means is connected to an output circuit for memorizing the information available at the output thereof, which permits the subtracting means to be reset to zero for a fresh measuring operation.

5. Apparatus according to claim 1 characterised in that the voltage-frequency converter is a programmable unijunction transistor type oscillator.

* * * * *